(12) United States Patent
Arai

(10) Patent No.: US 12,043,063 B2
(45) Date of Patent: Jul. 23, 2024

(54) TIRE

(71) Applicant: Sumitomo Rubber Industries, Ltd., Kobe (JP)

(72) Inventor: Mahito Arai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 343 days.

(21) Appl. No.: 17/520,215

(22) Filed: Nov. 5, 2021

(65) Prior Publication Data

US 2022/0153065 A1      May 19, 2022

(30) Foreign Application Priority Data

Nov. 17, 2020   (JP) .................................. 2020-191112

(51) Int. Cl.
   *B60C 11/11*    (2006.01)
   *B60C 11/03*    (2006.01)
   *B60C 11/12*    (2006.01)

(52) U.S. Cl.
   CPC ...... *B60C 11/0302* (2013.01); *B60C 11/1204* (2013.01); *B60C 2011/0355* (2013.01); *B60C 2011/1213* (2013.01)

(58) Field of Classification Search
   CPC .................................................. B60C 11/0302
   See application file for complete search history.

(56) References Cited

U.S. PATENT DOCUMENTS

| 9,764,601 B2 * | 9/2017 | Korkama ............ B60C 11/1307 |
| 2017/0021674 A1 * | 1/2017 | Abe ........................ B60C 11/13 |
| 2018/0111421 A1 * | 4/2018 | Nagasawa ............... B60C 11/12 |
| 2018/0333993 A1 | 11/2018 | Fujimoto et al. |
| 2022/0176747 A1 * | 6/2022 | Harada .................... B60C 11/11 |

FOREIGN PATENT DOCUMENTS

| JP | 2018-193056 A | 12/2018 |
| WO | WO-2020217935 A1 * | 10/2020 ......... B60C 11/0302 |

* cited by examiner

*Primary Examiner* — Robert C Dye
(74) *Attorney, Agent, or Firm* — Birch, Stewart, Kolasch & Birch, LLP

(57) ABSTRACT

A tire has a tread portion bound with an intended tire rotational direction. The tread portion includes a first tread edge and a second tread edge. The tread portion is provided with first oblique grooves extending obliquely toward a heel side in the tire rotational direction from the first tread edge toward a tire equator side, second oblique grooves extending obliquely toward the heel side from the second tread edge toward the tire equator side, and first circumferential grooves each connecting a respective pair of the first oblique grooves adjacent to each other in a tire circumferential direction. The first oblique grooves have the tire equator side end portions intersecting with the second oblique grooves. The second oblique grooves have the tire equator side end portions intersecting with the first oblique grooves. The first circumferential grooves have groove widths each increasing toward the heel side in the tire rotational direction.

17 Claims, 6 Drawing Sheets

TIRE

RELATED APPLICATIONS

This application claims the benefit of foreign priority to Japanese Patent Applications No. JP2020-191112, filed Nov. 17, 2020, which are incorporated by reference in its entirety.

FIELD OF THE INVENTION

The present disclosure relates to a tire.

BACKGROUND OF THE INVENTION

In the past, various tires suitable for running on snow have been proposed. For example, Patent Document 1 below has proposed a tire with a plurality of first oblique grooves and joint grooves connecting between them. The first oblique grooves extend obliquely from a first tread edge on one side in the tire axial direction toward the tire equator, and terminate without being connected to any other groove. Each of the joint grooves extends between the two first oblique grooves with a constant groove width.

PRIOR ART

Patent Document

[Patent Document 1]
Japanese Unexamined Patent Application Publication No. 2018-193056

SUMMARY OF THE INVENTION

Problems to be Solved by the Disclosure

With the increasing performance of vehicles, tires in recent years have been required to have even better on-snow performance. In general, in order to improve the on-snow performance, the volume of the grooves in the tread can be increased. However, such a method may lead to a decrease in dry performance, which is running performance on dry roads.

The present disclosure was made in view of the above, and a primary object thereof is to provide a tire capable of exerting excellent on-snow performance while maintaining the dry performance.

Means for Solving the Problems

The present disclosure is a tire including a tread portion bound with an intended tire rotational direction, wherein the tread portion includes a first tread edge, a second tread edge, a plurality of first oblique grooves, a plurality of second oblique grooves, and a plurality of first circumferential grooves, the first oblique grooves extend obliquely toward a heel side in the tire rotational direction from at least the first tread edge toward a tire equator side, the second oblique grooves extend obliquely toward the heel side in the tire rotational direction from at least the second tread edge toward the tire equator side, each of the first circumferential grooves extends so as to intersect with and connect a respective pair of the first oblique grooves adjacent to each other in a tire circumferential direction, each of the first oblique grooves has the tire equator side end portion intersecting with a respective one of the second oblique grooves, each of the second oblique grooves has the tire equator side end portion intersecting with a respective one of the first oblique grooves, and each of the first circumferential grooves has a groove width increasing toward the heel side in the tire rotational direction.

Effects of the Disclosure

By adopting the above configuration, the tire of the present disclosure is able to exert excellent on-snow performance while maintaining the dry performance.

DETAILED DESCRIPTION OF THE INVENTION

An embodiment of the present disclosure will now be described in detail in conjunction with accompanying drawings.

Figure 1:
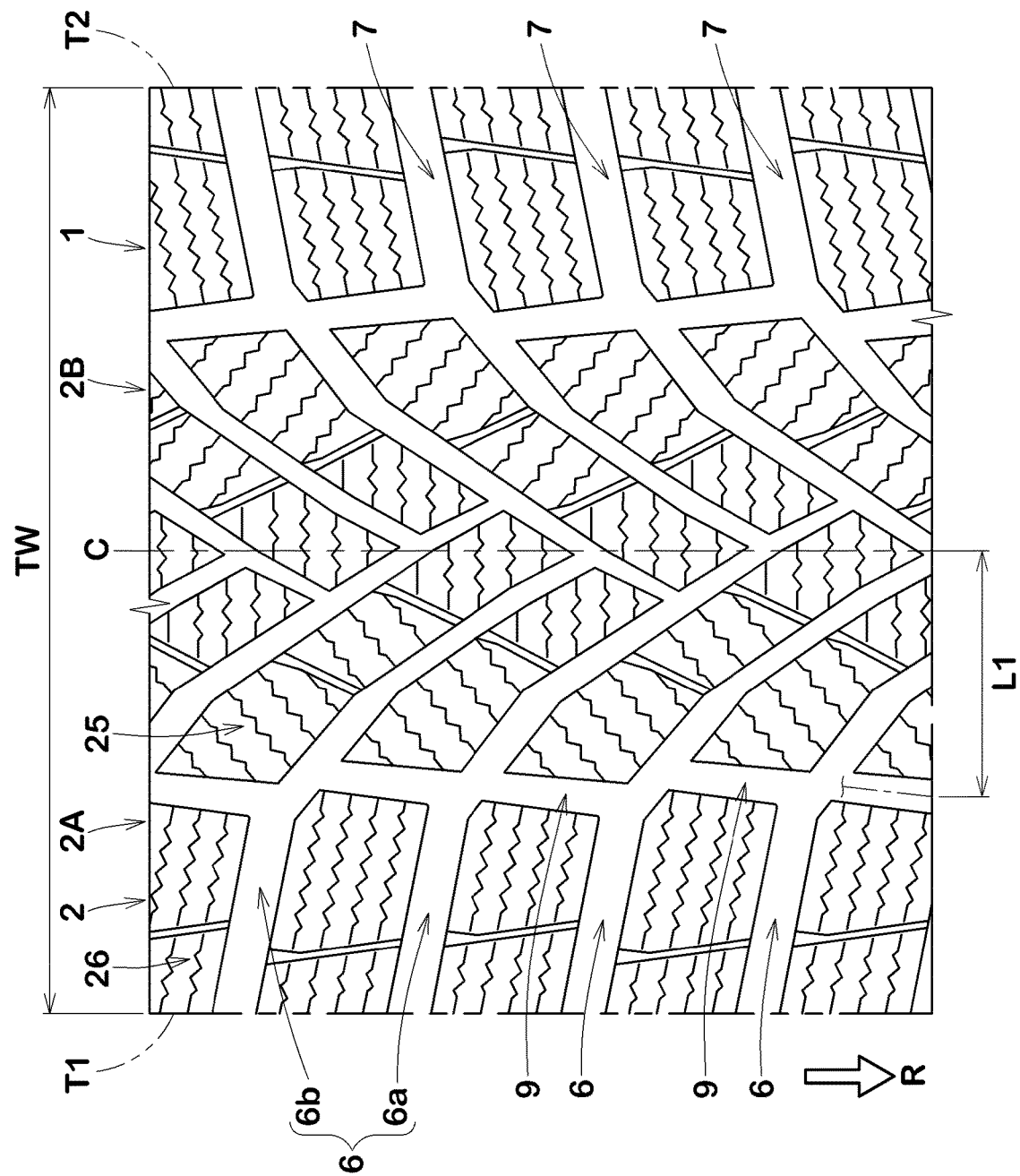
FIG. 1 a development view of a tread portion of a tire according to an embodiment of the present disclosure.

FIG. 1 is a development view of a tread portion 2 of a tire according to the present embodiment (hereinafter referred to simply as "tire") 1. As shown in FIG. 1, the tire 1 of the present embodiment is a pneumatic tire for winter, for example, and preferably for passenger cars. However, the tire 1 of the present disclosure is not limited to these types of tire.

The tire 1 of the present embodiment is provided with a directional pattern bound with an intended tire rotational direction (R), for example. The rotational direction (R) is indicated by letters or symbols on a sidewall portion (not shown), for example.

The tread portion 2 of the tire 1 of the present embodiment includes a first tread edge T1 and a second tread edge T2. Further, the tread portion 2 includes a first tread portion 2A demarcated between a tire equator (C) and the first tread edge T1, and a second tread portion 2B demarcated between the tire equator (C) and the second tread edge T2 The first tread portion 2A and the second tread portion 2B are essentially symmetrical with respect to the tire equator (C), except for misalignment in a tire circumferential direction. Thereby, at least each configuration of the first tread portion 2A described below can be applied to the second tread portion 2B.

The first tread edge T1 and the second tread edge T2 are outermost ground contacting position in a tire axial direction of the tire 1 when the tire 1 in a standard state is in contact with a flat surface with zero camber angle by being loaded with a standard tire load.

In the case of pneumatic tires for which various standards are specified, the "standard state" is a state in which the tire is mounted on a standard rim (not shown), inflated to a standard inner pressure, and loaded with no tire load. In the case of tires for which various standards are not specified, the standard state refers to a standard operating condition of the tire according to an intended use thereof, which means a state in which the tire is not mounted on a vehicle and loaded with no tire load. In the present specification, unless otherwise noted, the dimensions and the like of various parts of the tire are the values measured in the standard state described above.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

In the case of tires for which various standards are specified, the "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. Further, in the case of tires for which various standards are not specified, the "standard tire load" refers to the load applied to a single tire under a standard mounting condition of the tire. The "standard mounting condition" refers to the condition in which the tires are mounted on a standard vehicle according to the intended use of the tires and the vehicle is stationary on a flat road surface in a roadworthy condition.

The tread portion 2 is provided with a plurality of first oblique grooves 6 and a plurality of second oblique grooves 7. The first oblique grooves extend from at least the first tread edge T1 toward the tire equator (C) side, inclining toward the rotational direction (R) side, i.e., the heel side in the rotational direction (R). The second oblique grooves extend from at least the second tread edge T2 toward the tire equator (C) side, inclining toward the heel side in the rotational direction (R). Further, the tread portion 2 is provided with first circumferential grooves 9 each intersecting with and connecting a respective pair of the first oblique grooves 6 adjacent to each other.

Each of the first oblique grooves 6 has an end portion on the tire equator (C) side connected to a respective one of the second oblique grooves 7. Each of the second oblique grooves 7 has an end portion on the tire equator (C) side connected to a respective one of the first oblique grooves 6. Each of the first circumferential grooves 9 has a groove width increasing toward the rotational direction (R). By adopting the above configuration, the tire of the present disclosure is able to exert excellent on-snow performance while maintaining the dry performance. The following mechanisms can be inferred as reasons for this.

In the tire 1 of the present disclosure, the end portion on the tire equator (C) side of each of the first oblique grooves 6 is connected to a respective one of the second oblique grooves 7, and the end portion on the tire equator (C) side of each of the second oblique grooves 7 is connected to a respective one of the first oblique grooves 6, therefore, hard snow blocks can be formed at connection portions of the oblique grooves, and a large reaction force (hereinafter referred to as snow shearing force) can be obtained by shearing the snow block.

In addition, since the width of each of the first circumferential grooves 9 increases toward the rotational direction (R), the snow block in each of the first circumferential grooves 9 can be compacted tightly in a longitudinal direction of the each of the first circumferential grooves 9 by using the tire rotation, therefore, a larger snow shearing force can be obtained.

The above effect can be obtained independently of the enlargement of the groove volume. Therefore, the dry performance can be maintained. It is inferred that the present disclosure can achieve excellent on-snow performance while maintaining the dry performance through such a mechanism.

The more detailed configuration of the present embodiment will be described below. It should be noted that each of the configurations described below represents a specific form of the present embodiment. Therefore, it goes without saying that the present disclosure can exert the above-mentioned effects even if it does not have the configuration described below. Further, even if any one of the configurations described below is applied alone to the tire of the present disclosure having the above-mentioned features, the performance can be expected to be improved according to each configuration. Furthermore, when some of the configurations described below are applied in combination, the combined improvement of performance according to each configuration can be expected.

Figure 2:
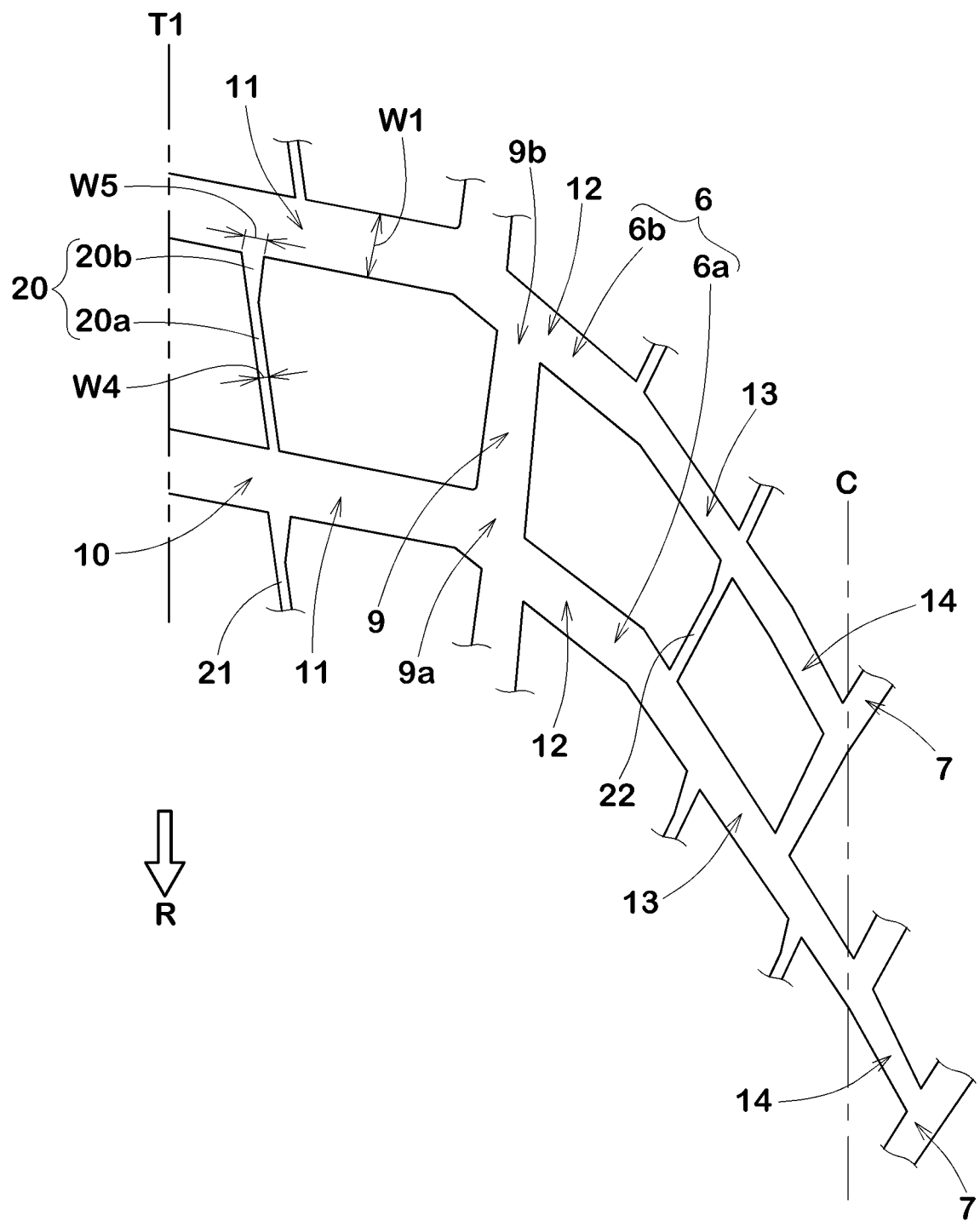
FIG. 2 an enlarged view of contours of first obliques grooves of FIG. 1.

FIG. 2 shows an enlarged view of contours of the first oblique grooves of FIG. 1. It should be noted that the sipes arranged in the land regions are omitted in FIG. 2. As shown in FIG. 2, the first oblique grooves 6 include transverse first oblique grooves (6a) crossing the tire equator (C) to connect with the second oblique grooves 7 and non-transverse first oblique grooves (6b) not crossing the tire equator (C) and connected to the second oblique grooves 7, for example.

Each of the first oblique grooves 6 has an angle with respect to the tire axial direction increasing toward the tire equator (C), for example. The first oblique grooves 6 configured as such provide snow shearing force in multiple directions, therefore, the first oblique grooves 6 are helpful for improving traction performance and cornering performance on snow.

It is preferred that each of the first oblique grooves 6 includes a plurality of linear groove portions 10 extending linearly at an angle with respect to the tire axial direction. As a more preferred embodiment, each of the first oblique grooves 6 of the present embodiment consists of a plurality of the linear groove portions 10 and does not include a curved groove edge. The first oblique grooves 6 configured as such can increase the land region area while maintaining the frictional force generated by the groove edges, compared to oblique grooves consisting of curved groove edges.

Each of the first oblique grooves 6 includes a first linear groove portion 11, a second linear groove portion 12, a third linear groove portion 13, and a fourth linear groove portion 14, for example. The first linear groove portion 11 extends in the tire axial direction linearly at least from the first tread edge T1 and obliquely with respect to the tire axial direction, for example. The second linear groove portion 12 is connected with the first linear groove portion 11 and extends linearly at a greater angle with respect to the tire axial direction than the first linear groove portion 11. The third linear groove portion 13 is connected with the second linear groove portion 12 and extends linearly at a greater angle with respect to the tire axial direction than the second linear groove portion 12. The fourth linear groove portion 14 is connected with the third linear groove portion 13 and extends linearly at a greater angle with respect to the tire axial direction than the third linear groove portion 13.

The first linear groove portion 11 has an angle of 5 degrees or more and 15 degrees or less with respect to the tire axial direction, for example. The first linear groove portion 11 has a length (the so-called periphery length along a length direction of the groove) of 25% or more and 40% or less of a total length of each of the first oblique grooves 6 from the first tread edge T1 to the end on the tire equator (C) side (which is also the periphery length described above). In the following, unless otherwise noted, the length of a groove or a groove portion refers to the so-called periphery length along a length direction thereof.

The angle of the second linear groove portion 12 with respect to the tire axial direction is 30 degrees or more and 40 degrees or less, for example. The second linear groove portion 12 has a length smaller than the length of the first linear groove portion 11, for example, 15% or more and 30% or less of the total length of each of the first oblique grooves 6.

The angle of the third linear groove portion 13 with respect to the tire axial direction is 50 degrees or more and 60 degrees or less, for example. The third linear groove portion 13 has a length smaller than the length of the second linear groove portion 12, for example, 25% or more and 40% or less of the total length of each of the first oblique grooves 6.

The angle of the fourth linear groove portion 14 with respect to the tire axial direction is 55 degrees or more and 65 degrees or less, for example. The fourth linear groove portion 14 has a length smaller than the length of the third linear groove portion 13, for example, 5% or more and 15% or less of the total length of each of the first oblique grooves 6.

Due to the arrangement of the linear groove portions described above, it is possible that the traction performance and the cornering performance on snow are improved in a good balance. However, first oblique grooves 6 are not limited to such an arrangement of the linear groove portions 10.

The first linear groove portion 11 extends with a constant groove width, for example. The groove width W1 of the first linear groove portion 11 is 3.0% or more and 6.0% or less of a tread width TW (shown in FIG. 1), for example. The first linear groove portion 11 configured as such is helpful for increasing the on-snow performance while maintaining the dry performance. It should be noted that the tread width TW is a distance in the tire axial direction from the first tread edge T1 to the second tread edge T2 of the tire 1 in the standard state.

In each of the first oblique grooves 6, the groove width decreases from the second linear groove portion 12 to the fourth linear groove portion 14. The groove width at the end on the tire equator (C) side of each of the first oblique grooves 6 is 25% or more and 50% or less of the groove width W1 of the first linear groove portion 11. Thereby, the rigidity near the tire equator (C) of the tread portion 2 is increased, and the dry performance is improved.

Further, the groove width at an end on the tire equator (C) side of each of the transverse first oblique grooves (6a) is smaller than the groove width at the end on the tire equator (C) side of each of the non-transverse first oblique grooves (6b). Thereby, the frequency band of the noise generated by the first oblique grooves 6 is easily dispersed, therefore, noise performance is improved.

In order to increase the effect described above, the length of the third linear groove portion 13 of each of the transverse first oblique grooves (6a) is larger than the length of the third linear groove portion 13 of each of the non-transverse first oblique grooves (6b). In addition, the third linear groove portion 13 of each of the transverse first oblique grooves (6a) has the groove width decreasing toward the tire equator (C). In contrast, the third linear groove portion 13 of each of the non-transverse first oblique grooves (6b) extends with a constant groove width.

Figure 3:
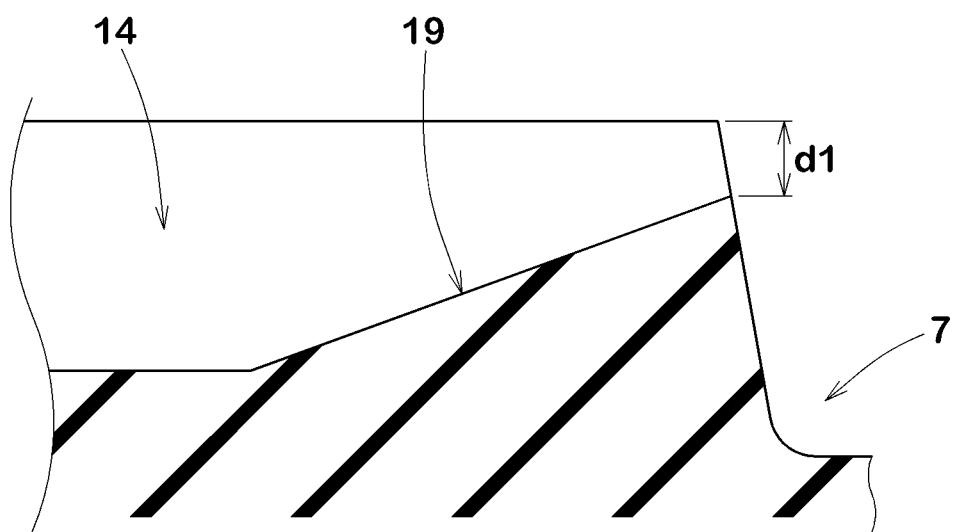
FIG. 3 a cross-sectional view taken along a length direction of a fourth linear groove portion of FIG. 2.

FIG. 3 shows a cross-sectional view taken along the length direction of the fourth linear groove portion 14 of the present embodiment. As shown in FIG. 3, it is preferred that the fourth linear groove portion 14 include a raised portion 19 that decreases in depth toward the end on the tire equator (C) side of each of the first oblique grooves 6. The raised portion 19 includes a bottom surface extending at an angle with respect to the ground contacting surface of the tread portion 2, for example. The raised portion 19 has a length of 5% or more and 15% or less of the length of each of the first oblique grooves 6, for example. The raised portion 19 has a minimum depth (dl) of 20% or more and 40% or less of a maximum depth of the fourth linear groove portion 14, for example. The raised portion 19 configured as such increases the rigidity near the tire equator (C) of the tread portion 2 to improve the dry performance, and also helps to prevent snow from clogging the first oblique grooves 6.

As shown in FIG. 1, a distance L1 in the tire axial direction from the tire equator (C) to each of the first circumferential grooves 9 is 20% or more and 30% or less of the tread width TW, for example.

As shown in FIG. 2, the first circumferential grooves 9 are inclined to a side opposite to the first oblique grooves 6 with respect to the tire axial direction, for example. The angle of each of the first circumferential grooves 9 with respect to the tire axial direction is, for example, greater than the angle of each of the fourth linear groove portions 14 with respect to the tire axial direction, for example, 80 degrees or more and 90 degrees or less. The first circumferential grooves 9 configured as such are helpful for improving the cornering performance on snow.

It is preferred that at least one end portion of each of the first circumferential grooves 9 is connected to a respective one of the second linear groove portions 12. More specifically, each of the first circumferential grooves 9 has an end portion (9a) on the heel side in the rotational direction (R) connected to the first linear groove portion 11 and the second linear groove portion 12 of one of the first oblique grooves 6 so as to extend between the first linear groove portion 11 and the second linear groove portion 12. And an end portion (9b) on an opposite side, i.e., a toe side in the rotational direction (R) is connected with the second linear groove portion 12 of one of the first oblique grooves 6.

Figure 4:
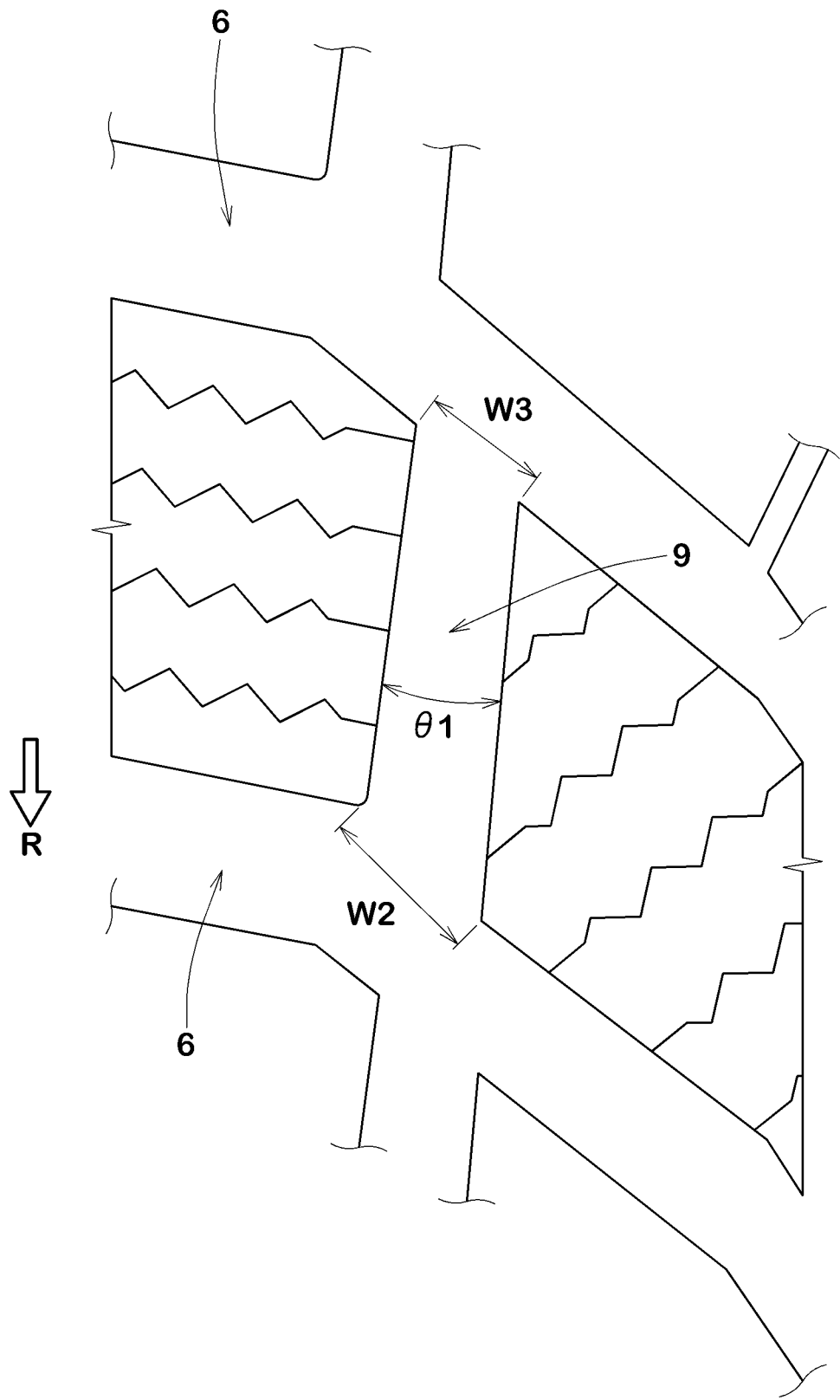
FIG. 4 an enlarged view of a first circumferential groove of FIG. 1.

FIG. 4 shows an enlarged view of one of the first circumferential grooves 9. As shown in FIG. 4, it is preferred that a groove width of each of the first circumferential grooves 9 increases continuously over an entire length thereof toward the rotational direction (R), i.e., toward the heel side in the rotational direction (R). Therefore, snow is more likely to be compacted inside the first circumferential grooves 9.

A first opening width W2 at one of the first oblique grooves 6 on the rotational direction (R) side, i.e., heel side, of each of the first circumferential grooves 9 is preferably 120% or more and more preferably 125% or more and preferably 140% or less and more preferably 135% or less of a second opening width W3 at one of the first oblique grooves 6 on the opposite side of the rotational direction (R), i.e., toe side, of the each of the first circumferential grooves 9. Further, an angle θ1 between one groove edge and the other groove edge of each of the first circumferential grooves 9 is 3 degrees or more and 7 degrees or less. Thereby, it is possible that the first circumferential grooves 9 form solid snow blocks while maintaining the rigidity of the land region around the first circumferential grooves 9. Therefore, the on-snow performance is improved while the dry performance is maintained.

In order to further increase the effect described above, it is preferred that the first opening width W2 and the second opening width W3 are larger than the groove width of the third linear groove portion 13 and the groove width of the second linear groove portion 12. Further, it is preferred that the second opening width W3 is smaller than the groove width of the first linear groove portion 11.

As shown in FIG. 2, the tread portion 2 is provided with a plurality of circumferential shallow grooves 20 each connecting a respective pair of the first oblique grooves 6 adjacent to each other in the tire circumferential direction and having a depth smaller than the depth of each of the first circumferential grooves 9. The depth of each of the circumferential shallow grooves 20 is a half or less of the depth of each of the first circumferential grooves 9, for example. Specifically, the depth of each of the circumferential shallow grooves 20 is preferably 25% or more, more preferably 30% or more, and preferably 40% or less, more preferably 35% or less, of the depth of each of the first circumferential grooves 9. The circumferential shallow grooves 20 configured as such improve the dry performance and the on-snow performance in a good balance.

Each of the circumferential shallow grooves 20 has a groove width increasing in the opposite direction to the first circumferential grooves 9, i.e., toward toe side. Each of the circumferential shallow grooves 20 of the present embodiment includes a first portion (20a) having a constant groove width and a second portion (20b) having a groove width increasing in the direction opposite to the rotational direction (R), i.e., toe side. The second portion (20b) is connected to the first portion (20a) on the opposite side of the rotational direction (R), i.e., toe side. In the circumferential shallow grooves 20 configured as such, snow is easily discharged from the second portion (20b) side, therefore, it is possible that snow is prevented from clogging inside.

An opening width W5 at one of the first oblique grooves 6 of the second portion (20b) is 1.5 times or more and 2.5 times or less a groove width W4 of the first portion (20a). Further, a length of the second portion (20b) is, for example, a half or less of the total length of the circumferential shallow grooves 20, and preferably 20% or more and 30% or less of the total length of each of the circumferential shallow grooves 20.

The circumferential shallow grooves 20 include outer circumferential shallow grooves 21 arranged on the first tread edge T1 side of the first circumferential grooves 9 and inner circumferential shallow grooves 22 arranged on the tire equator (C) side of the first circumferential grooves 9. In the present embodiment, there are one outer circumferential shallow grove 21 and one or two inner circumferential shallow grooves 22 arranged between two first oblique grooves 6 adjacent to each other.

As shown in FIG. 1, the tread portion 2 includes center land regions 25 each demarcated between a respective pair of the first oblique grooves 6 adjacent to each other and on the tire equator (C) side of a respective one of the first circumferential grooves 9, and outer land regions 26 each demarcated between two first oblique grooves 6 adjacent to each other and on the first tread edge T1 side of a respective one of the first circumferential grooves 9.

Figure 5:
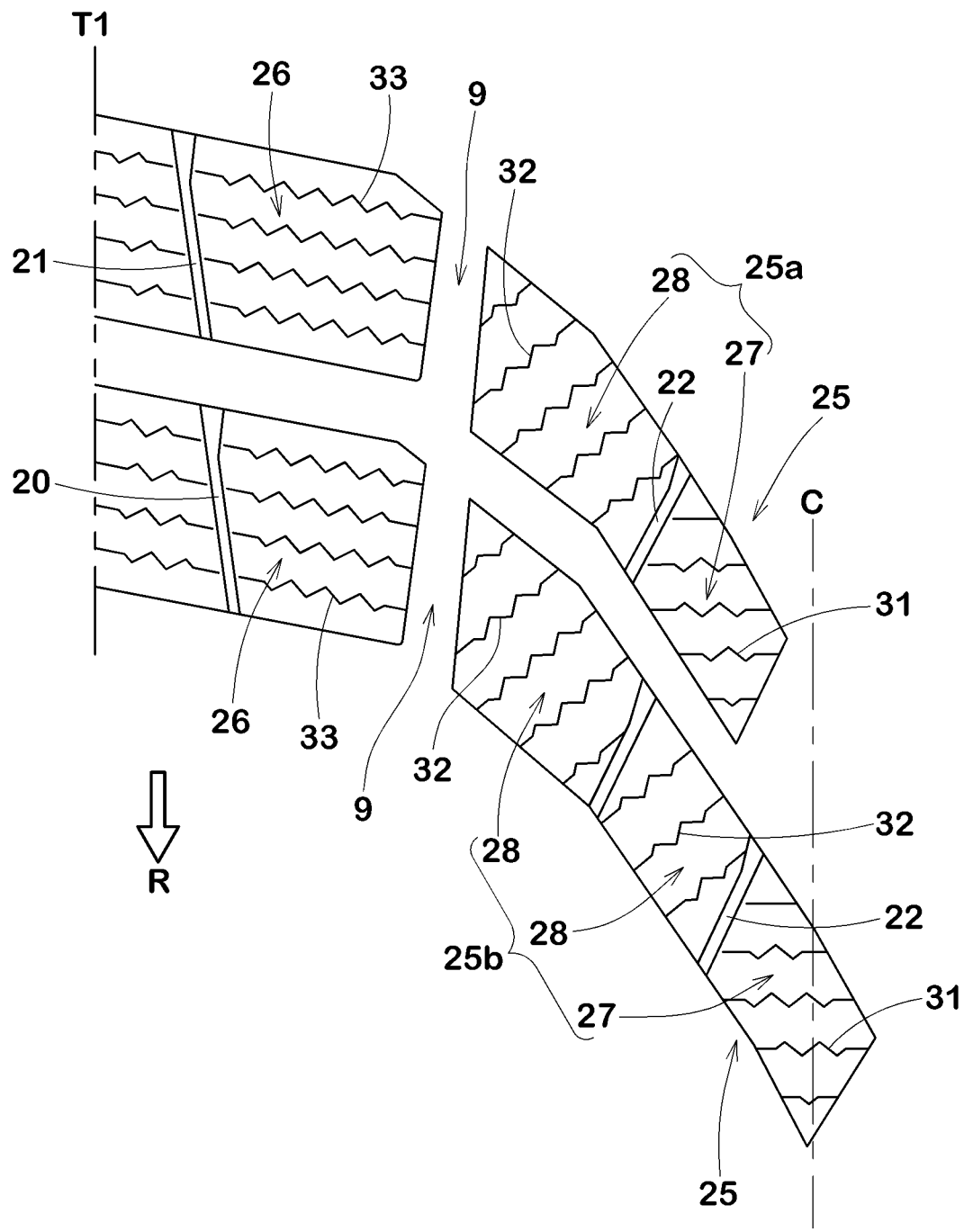
FIG. 5 an enlarged view of a center land region and an outer land region of FIG. 1.

FIG. 5 shows an enlarged view of the center land regions 25 and the outer land regions 26. As shown in FIG. 5, each of the center land regions 25 includes a plurality of block pieces divided by at least one circumferential shallow groove 20. The plurality of block pieces includes a crown block piece 27 demarcated on the most tire equator (C) side, and one or more middle block pieces 28 arranged on the first tread edge T1 side of the crown block piece.

The center land regions 25 in the present embodiment include first center land regions (25a) each consisting of one crown block piece 27 and one middle block piece 28 divided by one circumferential shallow groove 20, and second center land regions (25b) each consisting of one crown block piece 27 and two middle block pieces 28 divided by two circumferential shallow grooves 20.

Each of the block pieces is provided with a plurality of sipes. Each of the sipes in the present embodiment extends in a zigzag shape in a tread plane view, for example. Each of the sipes may also extend linearly. In this specification, the term "sipe" refers to an incision element having a small width, and a width of 1.5 mm or less between the two inner walls. The above-described width of each of the sipes is preferably 0.2 mm or more and 1.2 mm or less, and more preferably 0.5 mm or more and 1.0 mm or less. The width of each of the sipes of the present embodiment is in the aforementioned range over the entire depth of the sipe. It should be noted that the sipes may have chamfered opening portions or flask bottoms each having a width larger than the above range.

The crown block piece 27 is provided with a plurality of crown sipes 31 extending along the tire axial direction. Each of the crown sipes is arranged such that an imaginary line connecting two ends of the each of the sipes is inclined at an angle of 5 degrees or less with respect to the tire axial direction, for example. The crown sipes 31 configured as such provide, by edges thereof, a large frictional force in the tire circumferential direction.

Each of the middle block pieces 28 is provided with a plurality of middle sipes 32. The middle sipes 32 are inclined to a side opposite to the first oblique grooves 6 with respect to the tire axial direction, for example. An angle of an imaginary line connecting two ends of each of the middle sipes 32 with respect to the tire axial direction is smaller than the angle of each of the first circumferential grooves 9 and the angle of each of the circumferential shallow grooves 20, and the angle of the imaginary line of each of the middle sipes 32 is 40 degrees or more and 50 degrees or less, for example. The middle sipes 32 configured as such improve the traction performance and the cornering performance on snow in a good balance.

Each of the outer land regions 26 is provided with a plurality of outer sipes 33. The outer sipes 33 are inclined to the same side as the first oblique grooves 6 with respect to the tire axial direction, for example. In a preferred embodiment, an angular difference between an imaginary line connecting two ends of each of the outer sipes 33 and each of the first linear groove portions 11 is 5 degrees or less. The angle of the above-mentioned imaginary line with respect to the tire axial direction is 5 degrees or more and 15 degrees or less, for example.

In order to improve the dry performance and the on-snow performance in a good balance, as shown in FIG. 1, it is preferred that a land ratio (Lr) of the tread portion 2 in the present embodiment is 55% or more and 70% or less, for example. In the present specification, the "land ratio" is a ratio Sb/Sa of an actual total ground contacting area (Sb) and a total area (Sa) of a virtual ground contacting surface obtained by filling all grooves and sipes.

From the same point of view, it is preferred that a rubber hardness (Ht) of the tread rubber forming the tread portion 2 is 45 degrees or more and 65 degrees or less, for example. In the present specification, the above-mentioned "rubber hardness" is the hardness measured by a type-A durometer under an environment of 23 degrees Celsius in accordance with JIS-K6253.

While detailed description has been made of the tire according to an embodiment of the present disclosure, the present disclosure can be embodied in various forms without being limited to the illustrated embodiment. {Examples}

Figure 6:
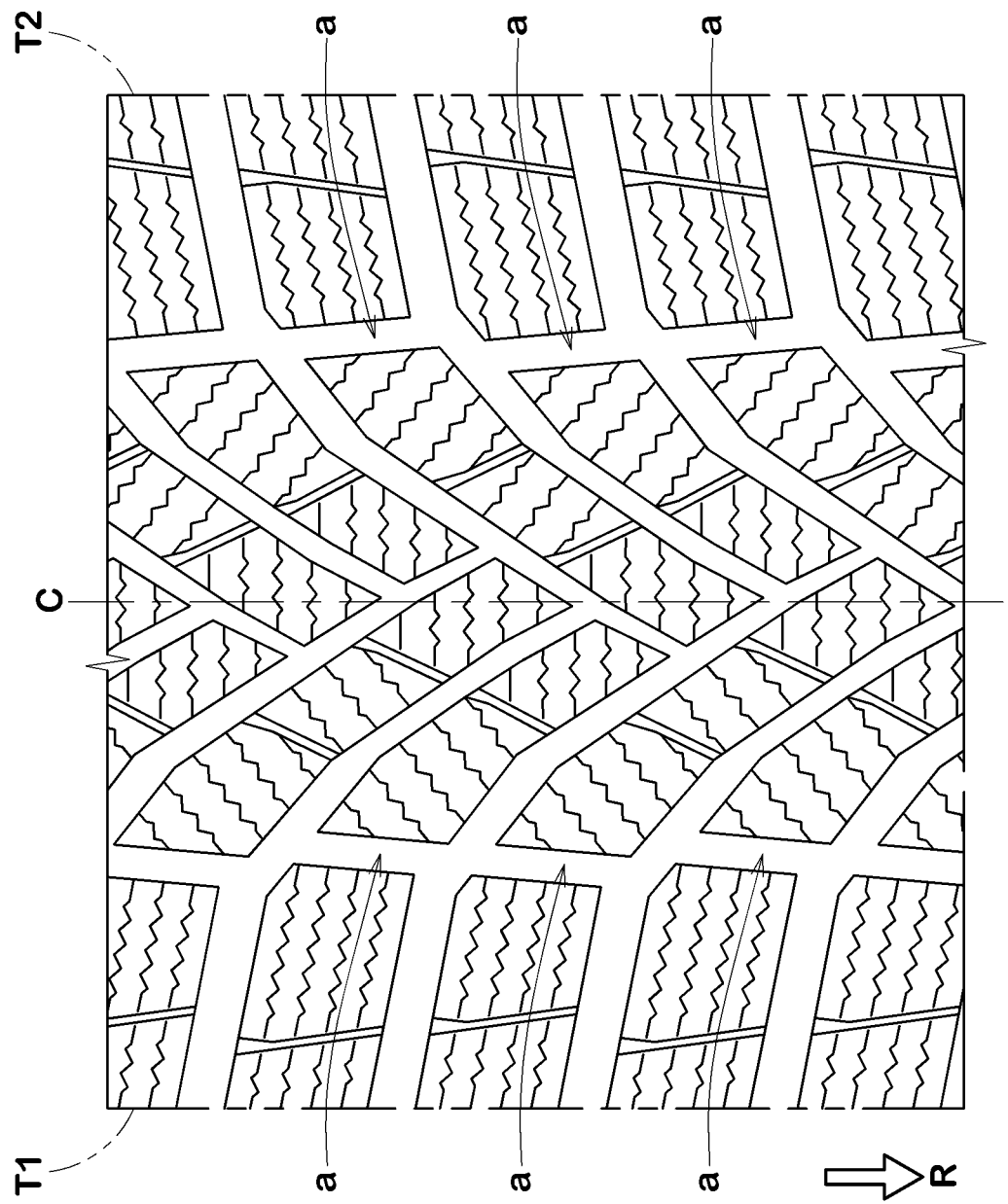
FIG. 6 a development view of the tread portion of a tire in Reference.

Pneumatic tires of size 205/55R16 having the basic tread pattern shown in FIG. 1 were made by way of test according to the specifications listed in Table 1. As a Reference, test tires were made by way of test in which first circumferential grooves (a) extended with a constant groove width, as shown in FIG. 6. The tires in the Reference were substantially the same as those shown in FIG. 1, except for the above points. The dry performance and the on-snow performance were tested for each of the test tires. The common specifications and test methods for each of the test tires were as follows.

Test vehicle: displacement of 2000 cc, front-wheel drive
Test tire mounting position: All wheels
Tire rim: 16×6.5
Tire inner pressure: front wheels 240 kPa, rear wheels 220 kPa <Dry Performance>

While a driver drove the test vehicle on a dry road surface, the running performance was evaluated by the driver's feeling. The results are indicated by an evaluation point based on the Reference being 100, wherein the larger the numerical value, the better the dry performance is.

<On-Snow Performance>

While a driver drove the test vehicle on a snowy road surface, the running performance was evaluated by the driver's feeling. The results are indicated by an evaluation point based on the Reference being 100, wherein the larger the numerical value, the better the on-snow performance is.

The test results are shown in Table 1.

the first oblique grooves extend obliquely toward a heel side in the tire rotational direction from at least the first tread edge toward a tire equator side, the second oblique grooves extend obliquely toward the heel side in the tire rotational direction from at least the second tread edge toward the tire equator side, each of the first circumferential grooves extends so as to intersect with and connect a respective pair of the first oblique grooves adjacent to each other in a tire circumferential direction, each of the first oblique grooves has the tire equator side end portion intersecting with a respective one of the second oblique grooves, each of the second oblique grooves has the tire equator side end portion intersecting with a respective one of the first oblique grooves, and each of the first circumferential grooves has a groove width increasing toward the heel side in the tire rotational direction.

[Present Disclosure 2]

The tire according to Present disclosure 1, wherein the groove width of each of the first circumferential grooves increases continuously toward the heel side in the tire rotational direction.

[Present Disclosure 3]

The tire according to Present disclosure 1 or 2, wherein the first circumferential grooves are inclined to a side opposite to the first oblique grooves with respect to a tire axial direction.

[Present Disclosure 4]

The tire according to any one of Present disclosures 1 to 3, wherein each of the first oblique grooves has an angle increasing toward the tire equator side with respect to a tire axial direction.

[Present Disclosure 5]

The tire according to any one of Present disclosures 1 to 4, wherein each of the first oblique grooves includes a plurality of linear groove portions extending linearly and obliquely with respect to a tire axial direction.

[Present Disclosure 6]

The tire according to any one of Present disclosures 1 to 5, wherein

TABLE 1

|  |  | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Figure showing Tread pattern | | FIG. 6 | FIG. 1 | FIG. 1 | FIG. 1 | FIG. 1 | FIG. 1 | FIG. 1 | FIG. 1 | FIG. 1 | FIG. 1 |
| First opening width W2/Second opening width W3 of First circumferential groove [%] | | — | 130 | 120 | 125 | 135 | 145 | 130 | 130 | 130 | 130 |
| Depth of Circumferential shallow groove/ Depth of First circumferential groove [%] | | 33 | 33 | 33 | 33 | 33 | 33 | 25 | 30 | 35 | 40 |
| Dry performance | [evaluation point] | 100 | 103 | 103 | 103 | 102 | 101 | 104 | 103 | 102 | 100 |
| On-snow performance | [evaluation point] | 100 | 108 | 106 | 107 | 108 | 108 | 105 | 107 | 108 | 109 |

As shown in Table 1, from the test results, it was confirmed that the tires in Examples exerted excellent on-snow performance while maintaining the dry performance.

[Statement of Disclosure]

The present disclosure includes the following aspects.

[Present Disclosure 1]

A tire comprising:

a tread portion bound with an intended tire rotational direction, wherein the tread portion includes a first tread edge, a second tread edge, a plurality of first oblique grooves, a plurality of second oblique grooves, and a plurality of first circumferential grooves, each of the first oblique grooves includes a first linear groove portion and a second linear groove portion, the first linear groove portion extends linearly in a tire axial direction and obliquely with respect to the tire axial direction at least from the first the first tread edge, the second linear groove portion is directly connected to the first linear groove portion and extends linearly at a greater angle with respect to the tire axial direction than the first linear groove portion, and at least one end portion of each of the first circumferential grooves intersects with a respective one of the second linear groove portions.

[Present Disclosure 7]

The tire according to any one of Present disclosures 1 to 6, wherein
the tread portion is provided with a plurality of circumferential shallow grooves, and
each of the circumferential shallow grooves intersects with and connects a respective pair of the first oblique grooves adjacent to each other in the tire circumferential direction and has a depth smaller than a depth of each of the first circumferential grooves.

[Present Disclosure 8]

The tire according to Present disclosure 7, wherein each of the circumferential shallow grooves has a groove width increasing toward a toe side in the tire rotational direction.

[Present Disclosure 9]

The tire according to Present disclosure 7 or 8, wherein
each of the circumferential shallow grooves includes a first portion and a second portion,
the first portion has a constant groove width, and
the second portion has a groove width increasing in a toe side in the tire rotational direction.

[Present Disclosure 10]

The tire according to any one of Present disclosures 1 to 9, wherein
the tread portion includes center land regions each demarcated between a respective pair of the first oblique grooves adjacent to each other and on the tire equator side of a respective one of the first circumferential grooves,
each of the center land regions includes a plurality of block pieces divided by at least one circumferential shallow groove extending so as to intersect with and connect the respective pair of the first oblique grooves demarcating the each of the center land regions and having a depth smaller than a depth of each of the first circumferential grooves, and
the block pieces include a crown block piece demarcated on the most tire equator side, and one or more middle block pieces arranged on the first tread edge side of the crown block piece.

[Present Disclosure 11]

The tire according to Present disclosure 10, wherein the crown block piece is provided with a plurality of crown sipes extending along a tire axial direction.

[Present Disclosure 12]

The tire according to Present disclosure 10 or 11, wherein the or each middle block piece is provided with a plurality of middle sipes inclined to a side opposite to the first oblique grooves with respect to a tire axial direction.

DESCRIPTION OF REFERENCE SIGNS 2 tread portion
6 first oblique groove
7 second oblique groove
9 first circumferential groove
T1 first tread edge
T2 second tread edge
R rotational direction

The invention claimed is:

1. A tire comprising:
a tread portion bound with an intended tire rotational direction, wherein
the tread portion includes a first tread edge, a second tread edge, a plurality of first oblique grooves, a plurality of second oblique grooves, and a plurality of first circumferential grooves,
the first oblique grooves extend obliquely toward a heel side in the tire rotational direction from at least the first tread edge toward a tire equator side,
the second oblique grooves extend obliquely toward the heel side in the tire rotational direction from at least the second tread edge toward the tire equator side,
each of the first circumferential grooves extends so as to intersect with and connect a respective pair of the first oblique grooves adjacent to each other in a tire circumferential direction,
each of the first oblique grooves has the tire equator side end portion intersecting with a respective one of the second oblique grooves,
each of the second oblique grooves has the tire equator side end portion intersecting with a respective one of the first oblique grooves,
each of the first circumferential grooves has a groove width increasing toward the heel side in the tire rotational direction,
each of the first oblique grooves includes a first linear groove portion and a second linear groove portion,
the first linear groove portion extends linearly in a tire axial direction and obliquely with respect to the tire axial direction at least from the first the first tread edge,
the second linear groove portion is directly connected to the first linear groove portion and extends linearly at a greater angle with respect to the tire axial direction than the first linear groove portion,
at least one end portion of each of the first circumferential grooves intersects with a respective one of the second linear groove portions,
each of the first oblique grooves further includes a third linear groove portion and a fourth linear groove portion,
the third linear groove portion is directly connected to the second linear groove portion and extends linearly at a greater angle with respect to the tire axial direction than the second linear groove portion, and
the fourth linear groove portion is directly connected to the third linear groove portion and extends linearly at a greater angle with respect to the tire axial direction than the third linear groove portion.

2. The tire according to claim 1, wherein the groove width of each of the first circumferential grooves increases continuously toward the heel side in the tire rotational direction.

3. The tire according to claim 1, wherein the first circumferential grooves are inclined to a side opposite to the first oblique grooves with respect to a tire axial direction.

4. The tire according to claim 1, wherein each of the first oblique grooves has an angle increasing toward the tire equator side with respect to a tire axial direction.

5. The tire according to claim 1, wherein
the tread portion is provided with a plurality of circumferential shallow grooves, and
each of the circumferential shallow grooves intersects with and connects a respective pair of the first oblique grooves adjacent to each other in the tire circumferential direction and has a depth smaller than a depth of each of the first circumferential grooves.

6. The tire according to claim 5, wherein each of the circumferential shallow grooves has a groove width increasing toward a toe side in the tire rotational direction.

7. The tire according to claim 5, wherein
each of the circumferential shallow grooves includes a first portion and a second portion,
the first portion has a constant groove width, and the second portion has a groove width increasing in a toe side in the tire rotational direction.

8. The tire according to claim 1, wherein
the tread portion includes center land regions each demarcated between a respective pair of the first oblique grooves adjacent to each other and on the tire equator side of a respective one of the first circumferential grooves,
each of the center land regions includes a plurality of block pieces divided by at least one circumferential shallow groove extending so as to intersect with and connect the respective pair of the first oblique grooves demarcating the each of the center land regions and having a depth smaller than a depth of each of the first circumferential grooves, and
the block pieces include a crown block piece demarcated on the most tire equator side, and one or more middle block pieces arranged on the first tread edge side of the crown block piece.

9. The tire according to claim 8, wherein the crown block piece is provided with a plurality of crown sipes extending along a tire axial direction.

10. The tire according to claim 8, wherein the or each middle block piece is provided with a plurality of middle sipes inclined to a side opposite to the first oblique grooves with respect to a tire axial direction.

11. The tire according to claim 8, wherein
the center land regions include first center land regions each consisting of one crown block piece and one middle block piece divided by one circumferential shallow groove, and second center land regions each consisting of one crown block piece and two middle block pieces divided by two circumferential shallow grooves, and
the first center land regions and the second center land regions are arranged alternately one by one in the tire circumferential direction.

12. The tire according to claim 1, wherein
the first linear groove portion extends with a constant groove width,
the second linear groove portion has a groove width smaller than the groove width of the first linear groove portion,
the third linear groove portion has a groove width smaller than the groove width of the second linear groove portion, and
the fourth linear groove portion has a groove width smaller than the groove width of the third linear groove portion.

13. The tire according to claim 1, wherein
the first oblique grooves include transverse first oblique grooves crossing the tire equator to intersect with the second oblique grooves and non-transverse first oblique grooves intersecting with the second oblique grooves without crossing the tire equator.

14. The tire according to claim 13, wherein the transverse first oblique grooves and the non-transverse first oblique grooves are arranged alternately one by one in a tire circumferential direction.

15. The tire according to claim 14, wherein a groove width of the tire equator side end portion of each of the transverse first oblique grooves is smaller than a groove width of the tire equator side end portion of each of the non-transverse first oblique grooves.

16. The tire according to claim 14, wherein the third linear groove portion of each of the transverse first oblique grooves has a length in a tire axial direction larger than a length in the tire axial direction of the third linear groove portion of each of the non-transverse first oblique grooves.

17. The tire according to claim 16, wherein
the third linear groove portion of each of the transverse first oblique grooves has a groove width continuously decreasing toward the tire equator over an entire length of the third linear groove portion of the each of the transverse first oblique grooves, and
the third linear groove portion of each of the non-transverse first oblique grooves has a constant groove width.

* * * * *